United States Patent
McIntosh et al.

(10) Patent No.: US 7,110,517 B2
(45) Date of Patent: Sep. 19, 2006

(54) SYSTEM AND METHOD FOR PROVISIONING COMPETITIVE LOCAL EXCHANGE CARRIER CUSTOMERS

(75) Inventors: Stephen McIntosh, North Palm Beach, FL (US); Sean Biganski, Lake Worth, FL (US)

(73) Assignee: BeQuick Software, Inc., Palm Beach Gardens, FL (US)

( * ) Notice: Subject to any disclaimer, the term of this patent is extended or adjusted under 35 U.S.C. 154(b) by 182 days.

(21) Appl. No.: 10/936,861

(22) Filed: Sep. 9, 2004

(65) Prior Publication Data

US 2006/0050861 A1 Mar. 9, 2006

(51) Int. Cl.
*H04M 3/42* (2006.01)
(52) U.S. Cl. .............................. 379/201.12; 379/220.01
(58) Field of Classification Search ...................... None
See application file for complete search history.

(56) References Cited

U.S. PATENT DOCUMENTS 6,661,888 B1 * 12/2003 Bell et al. .............. 379/221.13
2002/0159580 A1 * 10/2002 Bell et al. .............. 379/221.13
2004/0151292 A1 * 8/2004 Larsen ..................... 379/114.2
2004/0249927 A1 * 12/2004 Pezutti ........................ 709/223

* cited by examiner

*Primary Examiner*—Creighton Smith
(74) *Attorney, Agent, or Firm*—Howard M. Gitten; Edwards Angell Palmer & Dodge LLP

(57) ABSTRACT

A system for provisioning competitive local exchange carrier customers includes a server operatively linked with a CLEC, a provisioning agent and an ILEC. The server receives customer information from an agent or other order initiator. The server stores in a database ILEC identification information, CLEC identification information, plan information, the received customer information and order initiator information. The customer information is transmitted by the server to the CLEC. An ILEC is selected for said customer as a function of the customer and plan. The server determines whether a selected plan is available for the customer corresponding to the customer information and ILEC. The server transmits the customer information and plan information to the ILEC if the plan is available for that customer from the selected ILEC. The server also transmits all of the special feature block codes and USOCs associated with the plan.

13 Claims, 3 Drawing Sheets

SYSTEM AND METHOD FOR PROVISIONING COMPETITIVE LOCAL EXCHANGE CARRIER CUSTOMERS

BACKGROUND OF THE INVENTION

1. Field of Invention

This invention is directed to a method and apparatus for provisioning of service orders by competitive local exchange carriers, and more particularly to a method and apparatus which allows order initiators such as sales agents to process new customers for a variety of telephone plans and telephone companies.

2. Background

It is known in the art to provide local phone service to telephone end users utilizing competitive local exchange carriers (CLEC). These local phone companies provide connection between the customer and the incumbent local exchange carrier (ILEC). The ILEC is the traditional regional phone company and provides the traditional telephone service, including long distance in some cases. By virtue of the Telecommunications Act of 1996, the CLEC is authorized to resell the services of the ILEC to telephone end users. The CLEC becomes the de facto sales force for the ILEC as well as the virtual local phone company as it appears to the consumer.

As a result of government regulation, at both the federal and state levels, as well as a variety of service classes and telephone line features which can be offered (one or more of call waiting, caller ID, missed call callback, voice mail, and the like), each individual ILEC may offer a number of different service classes as a function of telephone line features offered by the ILEC in particular geographic areas, as well as a function of governmental ILEC regulation and technological capabilities. Accordingly, the various service classes and telephone line features offered by ILECs may not only be different between competitive ILECs, but an individual ILEC may offer a variety of service classes and features as a function of price, or customer location within the region. ILECs have developed a number of proprietary codes to identify each of their various service classes and telephone line features. Furthermore, state regulation may cause ILECs and therefore CLECs to offer different plans at different pricing to different customers even if located in the same geographic or demographic sales area.

Many CLECs utilize agents to enlist customers. The agents do the service order taking (obtaining of the information and providing the information regarding a type of service to the CLEC) for each customer. These orders are relayed to the CLEC so that an order may be initiated. For this, the agent receives a commission. The commission is a function of at least one of the type of plan, the policy of the CLEC, the number of plans sold by the agent (either in quantity or dollar value) or any other contractual arrangement between the agent and the CLEC. For example, the commission may be a percentage of the sale price of the contract, or may be a flat fee.

The prior art system was satisfactory, however, it suffered from the disadvantage that the process was complex and susceptible to human error. The provisioning of service orders is a cumbersome process in which the order initiator, usually an agent or employee of the CLEC, must be cognizant of a myriad of business rules, USOC codes, ILEC service class codes, service block codes and feature block codes. Therefore, even if the order initiator has extensive training, given the numerous ordering rules, the opportunity for human error is immense.

Furthermore, the prior art provisioning system requires that the order initiator, reenter customer name and address data from the CLEC billing engine or CRM software to an ILEC, enabling transcription errors. This factor is further compounded by the multiple ILECs for which the CLEC might be a reseller. Each ILEC has discrete and varying ordering system interfaces which the CLECs must use to provision orders.

The sales agents are often small neighborhood shops, having employees unsophisticated with CLEC or ILEC operations. These agents typically place orders with CLECs by telephoning a CLEC customer service representative and verbally conveying the order information, including customer name and address and plan type. This information must then be reentered into the ILEC provisioning system by the CLEC including providing the proper ILEC codes.

In many cases, the customers referred by agents are prepaying for service. Given the prepayment status of the end customer, the agent takes payment directly from the customer and then telephones a CLEC customer service representative to advise of the payment. At a later date, the CLEC will then collect the payment from the agent via mail or physical cash collection. As a result, there are delays in cash flow as well as transcription errors in posting and collection.

Accordingly, a system and method for overcoming the shortcomings of the prior art is desired.

SUMMARY OF THE INVENTION

A server, having a database, is remotely connected to a CLEC, an ILEC, and in a preferred embodiment, an agent. The server stores data in a database. The data includes identifying information for the ILEC, its associated service classes and telephone line features and the CLEC's commission schedule associated with each CLEC plan and/or agent. Customer information is transmitted to the server which stores the customer information in the database. The server transmits the customer information to a CLEC. An ILEC and CLEC plan stored in the database are selected for the customer and forwarded to the server. The server determines whether the selected plan is available for a customer corresponding to the customer information and transmits the customer information and plan to ILEC for fulfillment.

In another aspect of the invention, the server arranges for the processing and payment of commissions to the order initiator. When the agent is the order initiator, the agent can access the server through a remote communication method, such as the Internet, telephone or the like. Once logged in to the server, the agent can search the database for information regarding registered customers and post payments to the customer accounts. The server receives an amount that the customer wishes to pay as reported by the agent. The agent selects invoices stored in the database to which the payment should be applied. Once the invoices are paid, the server determines what commission is applicable to that customer and plan and applies that commission rate to the amount paid. The server then creates an invoice to be paid by the agent for the amount paid by the customer less the total commission earned.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
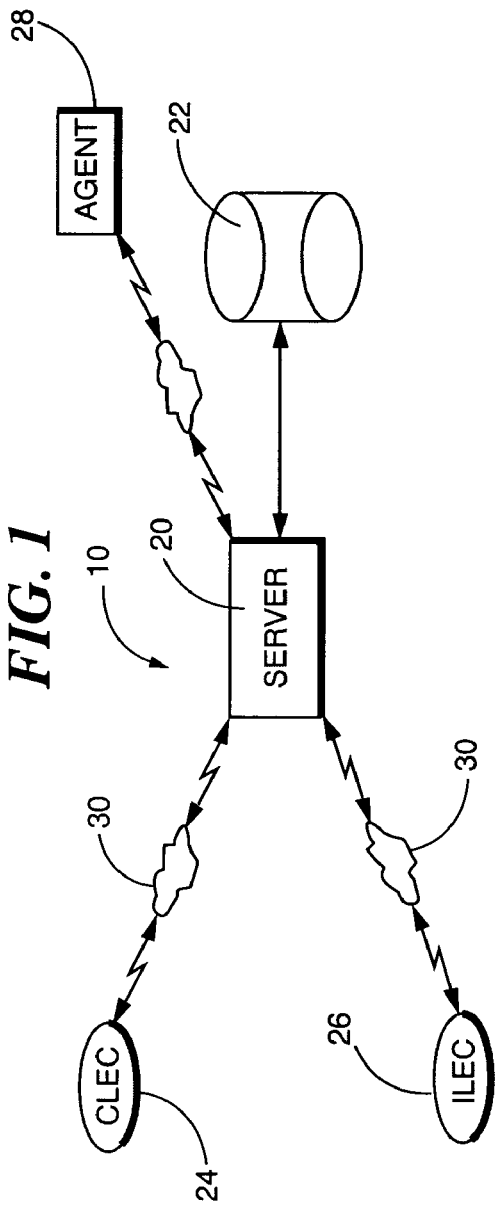
FIG. 1 is a schematic drawing of a system constructed in accordance with the invention.
Figure 2:
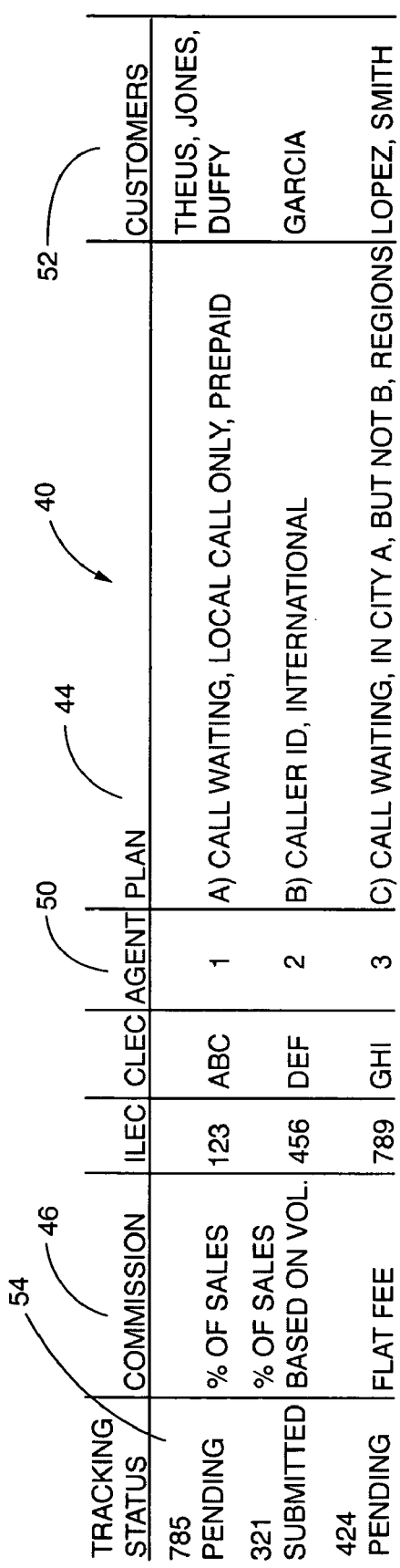
FIG. 2 is a exemplary table as stored in a database in accordance with the invention.

Reference is first made to FIG. 1 in which a system, generally indicated as 10, for provisioning new telephone service orders by a CLEC is provided. A server 20 is bi-directionally coupled to a database 22. Server 20 bi-directionally communicates with a CLEC 24, an ILEC 26, and in a preferred embodiment, although not necessary for performance of the invention, with an agent 28. Communication is performed by any two-way communication method such as, by way of non-limiting example, the use of computers at each of CLEC 24, ILEC 26 and agent 28, which communicate across the Internet 30 with server 20. Similarly, telephone modems, radio signals, or other wireless or wired direct or indirect communication may be used.

Database 22 stores the information necessary for server 20 to perform the invention. Database 22 stores data such as ILEC data 42, which identifies the ILEC, and associated ILEC service class and telephone line feature data 44. ILEC service class and telephone line feature data 44 may include the generic description of services offered by a respective ILEC such as call waiting, local calls only, or the rules associated with the particular ILEC, such as no service in certain geographical areas, or prepaid service only, by way of example. It also stores the corresponding block codes and USOCs for each feature of the respective CLEC plans, mapped to the features. Database 22 also stores commission data 46 associated with a particular agent, and, if desired, more narrowly a particular CLEC plan.

In a simplified version, data may be stored as a dedicated table 40 or, each of the respective types of data may be stored individually as files and mapped by server 20 to other associated data as is known in the art.

CLEC data 48 identifying respective CLECs, e.g. ABC, DEF or GHI associated with particular ILEC identifying data 42, e.g. 123, 456 or 789 and associated service class and telephone line feature data 44 are also stored in database 22. Service class and telephone line feature data 44 are the various combinations of service classes and telephone line features which make up a CLEC plan. By way of example, Plan A offered by CLEC ABC may include call waiting and prepaid local calls only, while Plan B offered by CLEC DEF may include caller ID and international long distance. The underlying ILEC code for ILEC 123 may be X24J3 for caller ID and LD23X for long distance. Each ILEC assigns its own proprietary codes and rules to the service classes and telephone line features offered by it. These proprietary codes are stored in database 22 as part of CLEC plan data 44 or ILEC data 42.

It should be noted that CLECs 24 may be associated with one or more ILECs 26 or one or more plans, however, for simplicity, CLEC data 48 is described in a one-to-one correspondence among ILEC data 42, plan data 44 and commission data 46. Similarly, in a preferred embodiment, agent data 50 is stored in database 22 and may form part of table 40. Agent data 50 is identifying information for the agent, e.g. agent 1, 2 or 3. Table 40 associates each agent 1, 2 or 3 with commission data 46 identifying how commissions are earned and how much is earned as a function of each plan of plan data 44 offered by the agent 28. Again, it is contemplated that agents 28 may be associated with more than one plan A–C, more than one commission structure, or more than one CLEC ABC-GHI, but for ease of explanation, the association is described in a one-to-one correspondence for plans and commissions in table 40.

It should be noted that the CLEC determines the commission for each agent as a function of the plan, the cumulative sales level for the agent, and stores this information as commission information 46 at server 20. Commission data 46, as determined, is mapped to a specific plan data 44 such as plan A which includes call waiting, local calls only and on a prepaid basis, which in turn is mapped by server 20 to a particular ILEC such as 123 or 456 which offers the service class and telephone line features included in plan A through an associated CLEC as identified by CLEC data 48. Server 20 also maps the ILEC plans to the ILEC codes and rules.

Figure 3:
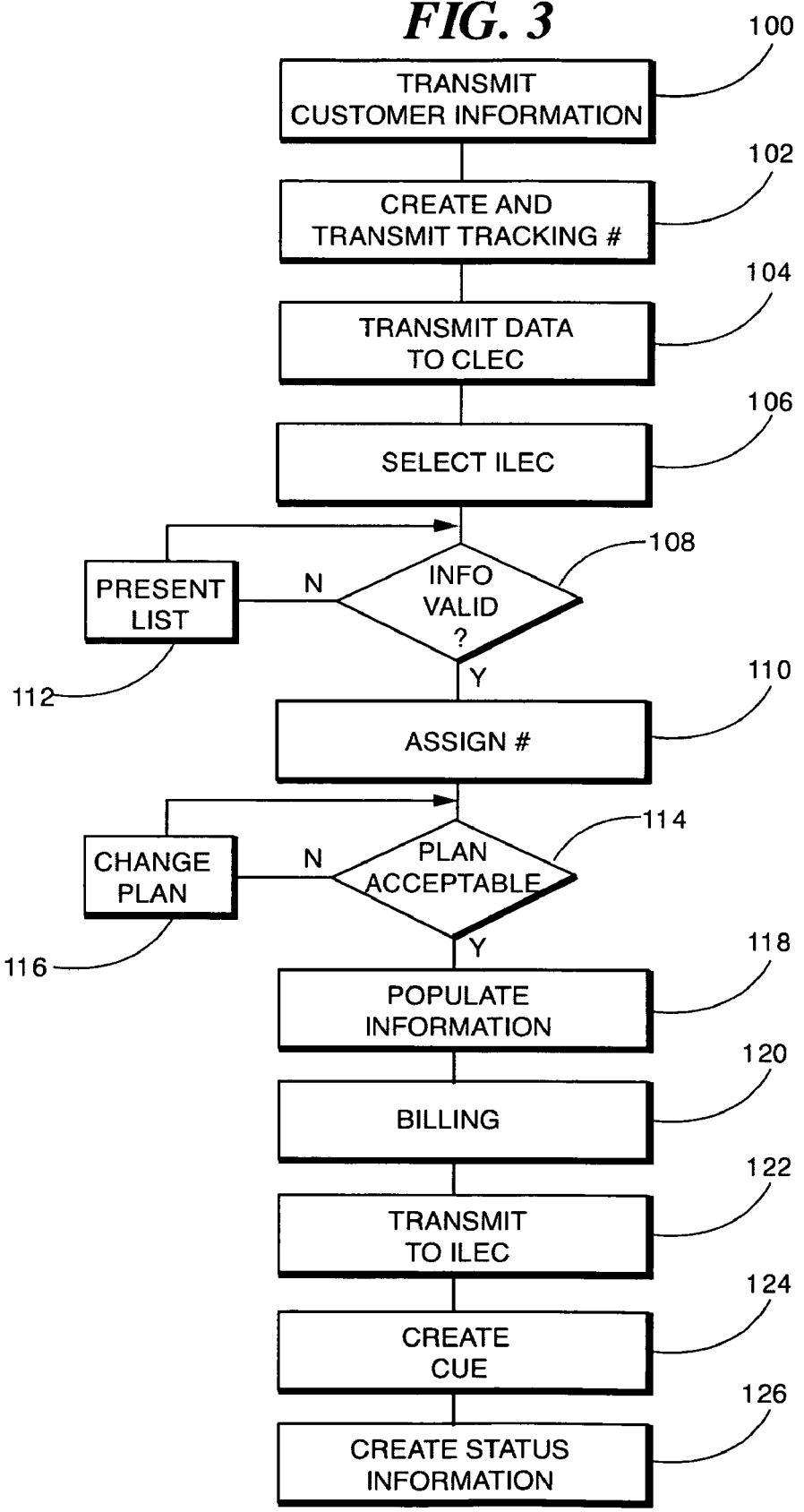
FIG. 3 is a flow chart for provisioning telephone service in accordance with the invention.

Reference is now made to FIG. 3 in which a method in which server 20 operates in accordance with the invention is provided. An order initiator, such as agent 28, communicating with server 20, by way of non-limiting example, across Internet 30, enters customer data 52 and transmits it to server 20 along with its agent identifier as stored in agent data 50 for storage in database 22 in a step 100. Customer data 52 may include customer name, such as Jones, Duffy, Theus, Garcia or the like, address, and desired plan. Server 20 stores customer data 52 and assigns an order identification number 54 to the order for tracking the processing of the order by server 20 and transmits the identification number to agent 28 in a step 102. The server now maps the appropriate agent data 50 customer data 52 and CLEC data 48.

Once the agent has entered the customer information in step 100 and receives the tracking identification number 54 in step 102, server 20 transmits the customer information 52 to CLEC 24, along with an order pending status indication in a step 104. Again the information is transmitted, by way of non-limiting example, over Internet 30 to computers provided at CLEC 24. When the customer information arrives at CLEC 24, CLEC 24 is notified by server 20 that an order is pending. An operator at CLEC 24 will chose an ILEC 26, order type, service type and carrier billing account number and assign it to the customer's order in step 106.

An operator at CLEC 24 chooses the ILEC 26, order type, service type and carrier billing account number to be assigned to the customer's order in step 106 based upon the information received from the agent. The employee at CLEC 24 indicates to server 20 the plan that corresponds to the customer ordered features. Server 20 presents plan information to the CLEC operator in generic language corresponding to plan service class and telephone line features. Once the CLEC operator selects the plan provided by server 20, server 20 automatically formats the associated ILEC codes into a manner required by the ILEC to process the order.

The customer information is then verified in a step 108. Each ILEC maintains a database of addresses and residents and businesses corresponding to that address. The customer information, by way of example, is validated by comparing the address to customer data provided by the ILEC or other third party database. If the address corresponds to that customer, then server 20 determines that the customer has in fact been validated and a telephone number is assigned by server 20 on behalf of the CLEC to the customer in step 110. This is done by selecting a phone number from available numbers, provided by the ILEC, to the customer address. If the address does not correspond to the customer, the CLEC employee is presented with a list of potential matches in step 112 from the ILEC customer data. It is again determined whether the information is valid in step 108.

The CLEC operator is provided with a list of available phone numbers as well as addresses from the ILEC database. The database may either be stored at server 20 or may be linked to a CLEC computer over Internet 30 as is known in the art. Step 108 is repeated until a single address corresponding to the customer information is determined from the ILEC database.

The plan is then verified in a step 114. Server 20 determines whether the plan is appropriate for the customer and the selected ILEC 26 by comparing the selected plan to parameters, e.g., business versus individual, rate zone location, customer physical location or the like. If the plan is inappropriate, i.e. not offered by ILEC 26, server 20 will notify CLEC 24 in a step 116 that the chosen plan is unavailable and provide a list of available plans for that customer and an operator at CLEC 24 can change the customer identified plan if needed in a step 116 and add additional features and blocks or change directory information listing for each phone number. Servers 20, by mapping the ILEC data 42 with the associated rules, automatically populates the customer order with service class codes, feature block codes, service block codes, USOCs and other billable features as a function of the selected plan in step 118. Because the codes are not universal among ILECs and can affect other feature codes, the automatic population of this information by the server alleviates human error and typographical errors. Once all features and plans are confirmed, the appropriate billing arrangements are determined in step 120.

Server 20 then forwards the mapped data to the selected ILEC 26 in a step 122. Server 20 changes the status of the order from pending to submitted and stores the associated status in database 22 as tracking data 54. This data can also be saved as a separate file and mapped to each other as known in the art.

It should be noted that agent 28 or an operator at CLEC 24 can poll server 20 to determine the status, pending versus submitted, of each individual order. The server will indicate to agent 28 or CLEC 24 the status of the submitted order, the due date for the completion of the order and other important order information.

In a step 124, the ILEC creates a queue table of submitted orders. Server 20 creates a Purchase Order Number (PON) for each number and stores that number in database 22 mapped to each appropriate ILEC customer. ILEC 26 then creates status information for each submitted number, such as completed, pending, Firm Order Completion (FOC) or clarification in step 126. Server 20 may poll ILEC 26 to determine the status of the submitted order in step 126. Server 20 stores this information, which can be polled by agent 28 or CLEC 24. If clarification is needed, server 20 may notify either agent 28 or CLEC 24 so that either party can address the error and resubmit the order to server 20, which in turn submits the order to the ILEC.

It should be noted that the above embodiment is a simplified version of the preferred embodiment for ease of description. It should be noted that the agent is not necessary to the invention and that the CLEC 24 or any other entity can initiate the order directly to server 20.

It should also be noted that server 20 may create an order log viewable by CLEC 24 or agent 28 which contains the order information such as customer data 52, plan data 44, agent data 50, CLEC data 48 and ILEC data 42 as well as the status of each order to confirm the accuracy of the input data and the status.

Figure 4:
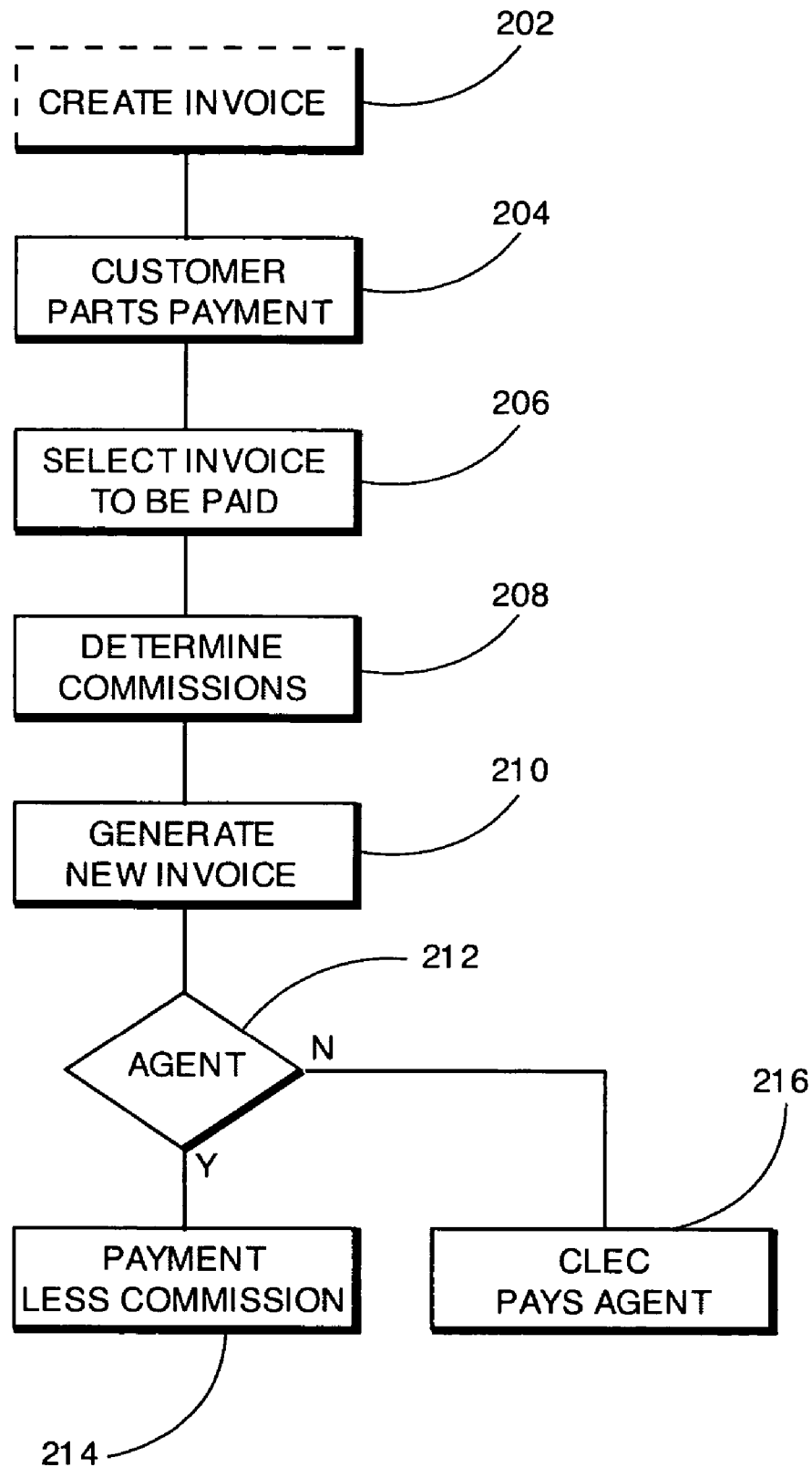
FIG. 4 is a flow chart for the handling of payments for a CLEC in accordance with the invention.

Reference is now made to FIG. 4 in which a method for determining payments due to each of the parties in accordance with the invention is provided. Once service has been provisioned, payments are made and allocated among the various parties to be paid, namely CLEC 24 and agent 28. In a first step 202, server 20 creates an invoice on behalf of CLEC 24 and transmits the invoice to agent 28. The invoice is a function of CLEC 24 and plan. In a step 204, the customer posts payment. The customer may directly pay either agent 28 or CLEC 24 dependent upon which entity originally provisioned the service for the customer. Additionally, in an alternative embodiment, the service is prepaid so that the creation of an invoice may actually occur after the customer posts payment in step 204.

Server 20 stores invoices associated with each customer in database 22. The entity, which is paying the bill, agent 28 by way of example, connects with server 20 and reviews the invoices stored in database 22 to determine whether or not there are any outstanding invoices. In a step 206, agent 28 selects which invoices are to be paid and enters payments received against those invoices. Payment can occur by automatic withdrawal from agent or customer's bank account utilizing the automated clearing house (ACH) network, by way of example, or by posting the customer's credit card number.

In a step 208, server 20 determines the commission owed agent 28 as stored in database 22, which as described above is a function of the one or more plans selected, the customer, and the particular agent. Utilizing the commission data 46, plan data 44, customer data 52 and agent data 50. Server 20 determines the commission due agent 28 as a function of the commission rules set by CLEC 24 for a particular plan, agent and/or customer.

In a step 210, server 20 generates an invoice to the agent, which reflects the amount due less the calculated commission to determine respective payments to be made to CLEC 24 and agent 28. In a step 212, it is determined whether or not the entity making the payment is an agent 28. If the entity is agent 28, then agent 28 causes payment, either through ACH, credit card or other means, from the customer to CLEC 24 in an amount equal to the invoice created for the agent. The agent either keeps the differential if paid in cash or is paid the commission through ACH,credit card payment or check by server 20. If the initiator is not an agent and in fact is the CLEC 24 itself, CLEC 24 will receive full payment from server 20 and pay agent 28 its commission from the full payment by any means known in the art.

It should be noted that agent 28 may in fact be one of many agents working for a master agent 36. Master agent 36 may be owed a commission based upon sales by agent 28. This information may also be stored as commission data 46. Server 20 indicates to CLEC 24 and/or agent 28 what percentage of money is owed to master agent 36 and may in fact communicate directly to master agent 36 utilizing Internet 30 or other means of remote communication.

As can be seen from the above description, a system and method for provisioning new CLEC service and allocating the appropriate fees, while reducing the room for error as a result of the numerous and complex rules and regulations associated with each individual CLEC, ILEC and agent is provided. Thus, while there have been shown and described and pointed out novel features of the present invention as applied to preferred embodiments thereof, it will be understood that various omissions and substitutions in the form and details of the disclosed invention may be made by those skilled in the art without departing from the spirit and scope of the invention. It is the intention therefore to be limited only as indicated by the claims appended hereto.

It is also to be understood that the following claims are intended to cover all the generic and specific features of the invention herein described and all statements of the scope of the invention, which, as a matter of language, might be said to fall therebetween.

What is claimed is:

1. A method for provisioning CLEC telephone service orders comprising the steps of:
   storing in a server ILEC identification information, CLEC identification information, plan information, customer information and order initiator information;
   transmitting customer information to a server for storing said customer information;
   said server transmitting said customer information to a CLEC;
   selecting an ILEC for said customer by transmitting plan information associated with said plan to said server and said server determining whether a selected plan is available for a customer corresponding to said customer information; and
   transmitting said customer information and said plan information to said ILEC.

2. The method of claim 1, further comprising the step of verifying said customer information by comparing said customer information to a customer address database.

3. The method of claim 2, wherein said customer address database is provided by said ILEC.

4. The method of claim 1, wherein said plan information includes a description of the plan, and associated service class codes, feature block codes, service block codes, and USOCs and further comprising the steps of selecting a plan as a function of the description, and said server providing, as a function of ILEC business rules, at least one of said block codes, feature block codes and USOC to said ILEC for a selected plan when said plan information is transmitted to said ILEC.

5. The method claim 1, further comprising the step of storing commission information in said database, said server determining a commission to be paid to said order initiator as a function of at least one of the plan, the agent information, the CLEC information and the ILEC information.

6. The method of claim 1, wherein if said server determines that the plan is not appropriate, said server notifies the CLEC and the plan to be provided to the customer is revised and resubmitted to the server.

7. The method of claim 1, wherein said server determines a status of said order, stores said status, and said order initiator remotely accesses said status.

8. The method of claim 7, wherein said server polls an ILEC to determine the status of said order and changing said status in response to the polling of said ILEC.

9. The method of claim 5, wherein said server creates an invoice for said service and transmits said invoice to said order initiator;
   said order initiator posting payment to said server;
   said server applying payment to said created invoice;
   the server determining the commission owed to the order initiator as a function of at least one of the plans selected, the customer information and the order initiator information and generates an invoice to the agent which reflects the total amount due from the customer less the calculated commission;
   and causes said commission to be paid to said order initiator and the agent invoice amount to be paid to the CLEC.

10. The method of claim 9 in which it is determined whether or not the order initiator is a CLEC or an agent, and paying to the CLEC full invoice amount if the order initiator is the CLEC.

11. A system comprising:
   a server communicating with a CLEC, an ILEC and an order initiator for receiving customer information from said order initiator and storing said customer information, said server transmitting said customer information to a CLEC and receiving plan information associated with a selected plan; determining whether a selected plan is available for the customer corresponding to the received customer information and transmitting said customer information and said plan information to said ILEC when said selected plan is available for said customer.

12. The system of claim 11, wherein said plan information includes a description of the service class codes and feature block codes, service block codes and USOCs, said server transmitting said service class codes, feature block codes, service block codes and USOCs corresponding to a plan description to said ILEC.

13. The method of claim 11 wherein said server determines a commission to be paid to the order initiator as a function of at least one of the plan, agent information, CLEC information and ILEC information.

* * * * *